United States Patent Office 3,785,946
Patented Jan. 15, 1974

3,785,946
PROCESS FOR ELECTROCOATING ALUMINUM ARTICLES
Shiro Terai, Toshio Suzuki, Yoshihumi Hasegawa, and Hitoshi Sekiya, Nagoya, and Hiroto Matuo and Shizuo Kimata, Tokyo, Japan, assignors to Toagosei Chemical Industry Co., Ltd., Sumitomo Light Metal Industries, Ltd., and Dainichiseika Color & Chemicals Mfg. Co. Ltd., Tokyo, Japan
No Drawing. Filed Sept. 8, 1972, Ser. No. 287,431
Claims priority, application Japan, Sept. 10, 1971, 46/69,731
Int. Cl. B01k 5/02
U.S. Cl. 204—181        15 Claims

ABSTRACT OF THE DISCLOSURE

In a process for electrodeposition-coating an aluminum article which comprises subjecting the aluminum article to anodic oxidation treatment, dipping the anodized aluminum article in an aqueous emulsion or solution of a thermosetting resin composition, applying a direct current to the aluminum article to electrodeposit thereon the resin contained in said aqueous emulsion or solution, and then heat-curing the resin coating electrodeposited on the aluminum article, an improvement characterized in that onto the surface of the anodized aluminum article is applied, prior to the electrodeposition, an aqueous solution, aqueous dispersion or organic solvent solution of an organo-silicon compound represented by the general formula,

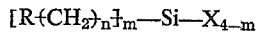

wherein $m$ is an integer of 1 to 3; $n$ is 0 or an integer of 1 to 3; R, in the case where $n$ is 0, is a lower alkenyl group, and R, in the case where $n$ is an integer of 1 to 3, is an amino group, an alkylenediamino group, a lower alkanolamino group, an $\alpha,\beta$-unsaturated lower aliphatic carboxylic acid residue, or an alkoxy or cycloalkyl group having an epoxy group; and X is at least one group selected from the group consisting of a lower alkoxy group, a lower alkoxyalkoxy group, a saturated lower aliphatic carboxylic acid residue, a hydroxyl group and a lower alkyl group, excluding the case where all the groups represented by X are lower alkyl groups at the same time. When such treatment with the organo-silicon compound is adopted, the adhesion of the resin coating and the corrosion resistance of the aluminum article is enhanced.

This invention relates to a process for electrodeposition-coating an aluminum article. More particularly, the invention pertains to an improvement in a process for electrodeposition-coating an aluminum article in which an anodic oxide film formed on the aluminum article is used as an under layer.

Processes for enhancing the corrosion resistance and the like of an aluminum article by electrodepositing a resin paint onto the surface of an anodic oxide film formed on said aluminum article are disclosed in, for example, U.S. Pat. 3,622,473 and British Pat. 1,126,855. According to these processes, however, the resin paint is directly electrodeposited onto the surface of the anodic oxide film without subjecting the film to any treatment, so that the adhesion of the resulting resin coating and the corrosion resistance of the product have not always been satisfactory. Further, the acid radical remaining in the anodic oxide film migrates into and accumulates in the resin paint bath to cause aging of the bath and coagulation of the water-soluble resin, with the result that inferior appearance of the product, ununiformity of film and like troubles are brought about.

An object of the present invention is to provide a process for electrodeposition-coating an aluminum article which is free from the above-mentioned drawbacks of the conventional processes and which can give a coated product excellent in adhesion, weather resistance, and chemical resistance, particularly acid and alkali resistance.

Other objects and advantages of the invention will become apparent from the description made hereunder.

The present invention is characterized in that an aluminum article is subjected to an anodic oxidation treatment to form an anodic oxide film thereon and then the thus formed film is treated with an organo-silicon compound to coat the film with an organic compound of aluminum silicate. The invention has been accomplished on the basis of the following discoveries:

(1) An aluminum article immediately after anodic oxidation is coated with an anodic oxide film to provide a hydrophilic surface high in content of aluminol (Al-OH). When this hydrophilic surface is treated with an organo-silicon compound having such a functional group as a methoxy, ethoxy or hydroxyl group, such group reacts with the aluminol to bring about condensation, and the resulting organic compound of aluminum silicate acts as a primer to coat the surface of the anodic oxide film.

(2) The organic compound of aluminum silicate surprisingly has an electric conductivity, and hence can be electrophoretically coated with an aqueous or water-soluble resin paint which is normally used.

(3) When the anodic oxide film coated with an organo-silicon compound having such a reactive group as an amino or epoxy group is electrodeposition-coated with a thermosetting resin paint, the above-mentioned amino or epoxy group undergoes, at the time of heat-curing of the resin paint, a crosslinking reaction with a carboxyl, hydroxyl, methylol, alkoxymethylol, epoxy or the like organic reactive group in the resin paint, whereby a new layer is formed at the interface between the anodic oxide film and the resin coating.

In accordance with the present invention, there is provided a process for electrodeposition-coating an aluminum article which comprises subjecting the aluminum article to anodic oxidation, dipping the anodized aluminum article in an aqueous emulsion or solution of a thermosetting resin composition, applying a direct current to the aluminum article to electrodeposit thereon the resin contained in said aqueous emulsion or solution, and then heat-curing the resin coating electrodeposited on the aluminum article, characterized in that onto the surface of the anodized aluminum article is applied, prior to electrodeposition, an aqueous solution, aqueous dispersion or organic solvent solution of an organo-silicon compound represented by the general formula,

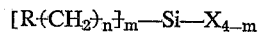

wherein $m$ is an integer of 1 to 3; $n$ is 0 or an integer of 1 to 3; R, in the case where $n$ is 0, is a lower alkenyl group, and R, in the case where $n$ is an integer of 1 to 3, is an amino group, an alkylenediamino group, a lower alkanolamino group, an $\alpha,\beta$-unsaturated lower aliphatic carboxylic acid residue, or an alkoxy or cycloalkyl group having an epoxy group; and X is at least one group selected from the group consisting of a lower alkoxy group, a lower alkoxyalkoxy group, a saturated lower aliphatic carboxylic acid residue, a hydroxyl group and a lower alkyl group, excluding the case where all the groups represented by X are lower alkyl groups at the same time.

The organo-silicon compound used in the present invention is represented by the general formula

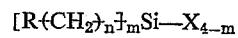

in which one terminal group, X, is a reactive group which reacts with aluminol to form a strong bond, and the other terminal group is a reactive group which chemically bonds to the resin component in the paint.

In the terminal group [R$(CH_2)_n$] when $n$ is 0, R is a lower alkenyl group, typical and preferable examples of which are vinyl and allyl groups. When $n$ is an integer of 1 to 3, i.e., $(CH_2)_n$ is a methylene, ethylene or trimethylene group, R is an amino group; an alkylenediamino group, e.g. an ethylenediamino, propylenediamino, tetramethylenediamino or hexamethylenediamino group; a lower alkanol group, e.g. a diethanolamino or mono- or di-propanolamino group; an $\alpha,\beta$-unsaturated lower aliphatic carboxylic acid residue (the term "carboxylic acid residue" referred to herein means a group formed by eliminating the hydrogen atom from the carboxyl group of carboxylic acid), e.g. an acrylic, methacrylic or crotonic acid residue; an alkoxy group having an epoxy group, e.g. a glycidoxy group; or a cycloalkyl group having an epoxy group, e.g. an epoxy-cyclohexyl group. When $m$ is 2 or 3 two or three groups of the formular [R$(CH_2)_n$] may be the same or different.

On the other hand, the group X is selected from the group consisting of a lower alkoxy group, e.g. a methoxy, ethoxy, propoxy or butoxy group; a lower alkoxyalkoxy group, e.g. a methoxyethoxy, methoxypropoxy or methoxybutoxy group; a saturated lower aliphatic carboxylic acid residue, e.g. an acetic, propionic or butyric acid residue; a hydroxyl group; and a lower alkyl group, e.g. a methyl, ethyl, propyl or butyl group. When $m$ is 1 or 2, all the groups represented by X may be same or different, though the case where all the groups X are lower alkyl groups at the same time is excluded, this also being true of the case where $m$ is 3, because an organo-silicon compound of such construction is not preferable for use in view of its reactivity with the resin component.

Examples of the organo-silicon compound, which is represented by the aforesaid general formula and is defined as above, are as follows:

Vinyl-triethoxysilane[CH$_2$=CHSi(OCH$_2$CH$_3$)$_3$],

Vinyl-tris($\beta$-methoxyethoxy)silane[OCH$_2$=CHSi(CH$_2$CH$_2$OCH$_3$)$_3$],

Vinyl-triacetoxysilane[CH$_2$=CHSi(O$\overset{O}{\overset{\|}{C}}$CH$_3$)$_3$], $\gamma$-Aminopropyl-triethoxysilane[H$_2$N(CH$_2$)$_3$Si(OCH$_2$CH$_3$)$_3$], $\beta$-Aminoethyl-triethoxysilane[H$_2$N(CH$_2$)$_2$Si(OCH$_2$CH$_3$)$_3$], Aminomethyl-triethoxysilane[H$_2$NCH$_2$Si(OCH$_2$CH$_3$)$_3$], $\gamma$-Aminopropyl-trimethoxysilane[H$_2$N(CH$_2$)$_3$Si(OCH$_3$)$_3$], N-$\beta$-(aminoethyl)-$\gamma$-aminopropyl-trimethoxysilane
[H$_2$N(CH$_2$)$_2$NH(CH$_2$)$_3$Si(OCH$_3$)$_3$], N-$\beta$-(aminoethyl)-$\gamma$-aminopropyl-methyldimethoxysilane
[H$_2$N(CH$_2$)$_2$NH(CH$_2$)$_3$Si(CH$_3$)(OCH$_3$)$_2$], $\gamma$-Methacryloxypropyl-trimethoxysilane

[CH$_2$=C(CH$_3$)$\overset{O}{\overset{\|}{C}}$O(CH$_2$)$_3$Si(OCH$_3$)$_3$], $\gamma$-N,N-diethanolaminopropyl-triethoxysilane
[(HOCH$_2$CH$_2$)$_2$N(CH$_2$)$_3$Si(OCH$_2$CH$_3$)$_3$], $\gamma$-Glycidoxypropyl-trimethoxysilane CH$_2$—CHCH$_2$O(CH$_2$)$_3$Si(OCH$_3$)$_3$],
  \O/

$\beta$-(3,4-epoxycyclohexyl)ethyl-trimethoxysilane

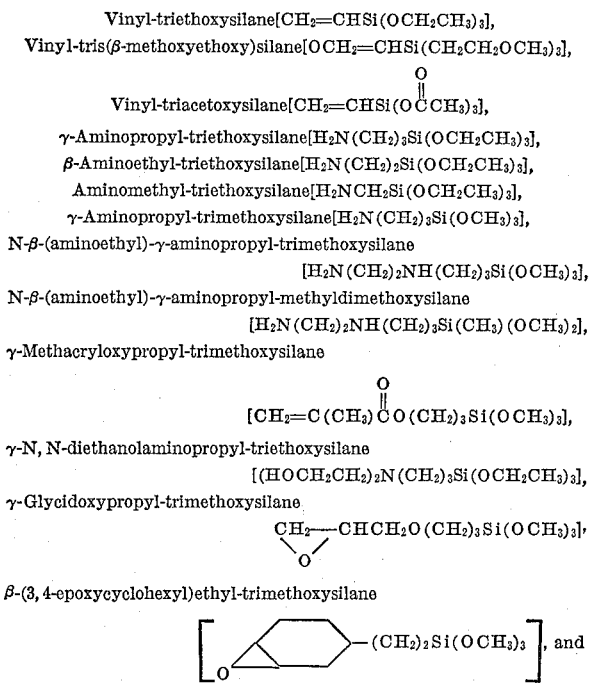

, and silanols corresponding to the above-mentioned silanes, for example, aminoalkyl silanols.

The above-mentioned organo-silicon compound forms, on the anodic oxide films, a primer layer comprising an organic compound of aluminum silicate. Since the thus formed primer layer shows an effect of coupling with both the anodic oxide film and the top coat layer comprising an electrodeposited resin paint, as mentioned previously, the coating electrodeposited according to the present invention strongly bonds chemically to the aluminum substrate to give a product which is markedly high in adhesion, chemical resistance and weather resistance.

The present invention is explained below in the order of steps adopted.

The material to be treated according to the present process is an aluminum article which has been subjected to anodic oxide film thereon. The aluminum article used in the present invention includes all of pure aluminum and aluminum alloy articles, which may be in any such forms as plates, sheets, tubes, extruded shapes, castings, forgings and fabricated products.

The anodic oxidation treatment adopted in the present invention aims at forming an oxide film layer comprising a non-porous barrier layer and a porous bulk layer, and is carried out according to a known procedure. The oxide film layer formed in this case is required to be higher in hydrophilic property. The electrolysis is effectively conducted, for example, under such conditions that the aluminum article is subjected to anodic oxidation treatment, using an electrolyte containing 10 to 30% by weight (in this specification, all percent and parts are by weight) of sulfuric acid, at a current density of 0.5 to 25 a./dm.$^2$ and at a bath temperature within the range from 10° to 35° C. for such a current-flowing time as to obtain a film having a desired thickness. The current-flowing time varies depending on the desired film thickness, and is long when the current density is low and is short when the current density is high, in general. In the case where the sulfuric acid concentration is maintained high and the current density is made high, a hydrophilic surface is easily obtainable. Furthermore, a film high in hydrophilic property can be obtained as well by use of a sulfuric acid bath incorporating 0.1 to 15% of at least one magnesium chloride, citric acid, tartaric acid, triethanolamine and sodium sulfate. All of anodic oxide films formed by ordinary anodic oxidation treatment using oxalic acid, chromic acid and various organic sulfonic acids, as main electrolytes in addition to sulfuric acid, and by anodic oxidation treatments carried out according to DC, AC and AC-DC processes, can be used in the process of the present invention.

To the aluminum article, on which an anodic oxide film has been formed, an organo-silicon compound is then applied by dipping, spraying or showering. It is preferable to apply the organo-silicon compound by dipping the aluminum article in the aqueous solution or dispersion or solvent solution of the organo-silicon compound. However, depending upon the size and shape of the aluminum article, a spray or shower of the aqueous solution or dispersion or solvent solution may be applied. In the latter case, the pressure of the spray or shower does not affect the effect of the present invention. It is sufficient that the spray or shower is continuously and uniformly supplied to the whole of the surface of the anodized aluminum article.

The aqueous solution of the organo-silicon compound is a solution in water or in a mixed solvent comprising water and a water-soluble organic solvent, such as methanol, ethanol, propanol, isopropanol, methyl Cellosolve, ethyl Cellosolve, acetone, methyl ethyl ketone and water soluble amines. Organic weak acids such as acetic acid, propionic acid, etc., may be used as stabilizers for the solution.

The aqueous dispersion of the organo-silicon compound may be prepared by dispersing a water-insoluble organo-silicon compound in water with or without about 1% by weight, based on the weight of the organo-silicon compound, of an emulsifier, such as conventional metal soaps or alkyl or alkylbenzene sulfonic acid salts or sulfuric acid salts, by means of a homomixer, or if necessary, by first dissolving the organo-silicon compound in the same amount of toluene or xylene and then dispersing the resulting solution in water with the above-mentioned emulsifier.

The organic solvents which may be used in the organic solvent solutions of the organo-silicon compound include alcohols, such as methyl alcohol, ethyl alcohol, propyl alcohol, isopropyl alcohol, etc.; ketones such as acetone, methyl ethyl ketone, methyl n-propyl ketone, diethyl ketone, etc.; ethers such as diethyl ether, dipropyl ether, diisopropyl ether, etc.; and esters such as ethyl acetate, methyl acetate, ethyl formate, methyl formate, etc.

The effect attained by this step resides in the enhancement in adhesion, weather resistance and corrosion resistance of the electrodeposited coating as mentioned above. In addition, the effectiveness, measured by the thickness of the coating produced, of the electrodeposition operation can be facilitated. This surprising fact is evident from the experimental results shown in Table 1.

TABLE 1

| Organo-silicon compound: | Thickness of electrodeposited coating ($\mu$) |
|---|---|
| Not applied | 13.0 |
|  | 14.0 |
| Applied | 17.6 |
|  | 17.5 |

The results shown in Table 1 were obtained in the following manner:

An aluminum plate [JIS (abbreviation of Japanese Industrial Standards) H–4000 and 1200] was degreased with acetone, and then slightly etched by dipping in a 10% aqueous sodium hydroxide solution at 50° C. for 1.5 minutes. Subsequently, the aluminum plate was washed with water, neutralized by dipping in a 10% nitric acid bath at 20° C. for 60 seconds, further washed with water, and then subjected to anodic oxidation treatment carried out by using a 15% aqueous sulfuric acid solution as a bath and passing an electric current for 4 minutes under such conditions as a bath temperature of 25° C. and a current density of 1 a./dm.$^2$, whereby an oxide film of 1$\mu$ in thickness was formed. The thus anodized plate was washed with water, and then subjected to electrodeposition at a current of 80 v. for 3 minutes in an acrylic resin-containing electrodeposition bath at 28° C., either as it was or after dipping at ordinary temperature for 1 minute in a 5% aqueous solution of N-$\beta$-(aminoethyl)-$\gamma$-aminopropyl-trimethoxysilane followed by water-washing. After the electrodeposition, the aluminum plate was washed with water and then heat-cured in a gas furnace at 180° C. for 30 minutes. In the above manner, there were prepared 2 sheets each of sample plates which had been subjected to the organo-silicon compound treatment and which had not been subjected to said treatment. The thickness of the coating formed on each sample plate was measured at 7 points, and an average value thereof was shown in Table 1. The thickness of the electrodeposited coating was measured by use of a non-destructive instrument for measuring thickness "Permascope" (manufactured by Hermt Fischer Co.).

As one of the means to solve various problems encountered in subjecting to electrodeposition coating an aluminum article immediately after anodic oxidation, there is provided a so-called semi-sealing treatment which incompletely seals fine pores of the anodic oxide layer. According to the semi-sealing treatment, it is difficult to form an electrodeposited coating of a desired thickness because the electric conductivity of the anodic oxide layer is degraded, though the extent of said degradation is not so marked as seen in the sealing treatments according to the steam process, the water glass process or the chromate process. Further, in the semi-sealing treatment, it is a conventional practice to continue a heat treatment at about 80° C. for about 10 minutes.

In contrast, according to the organo-silicon compound treatment adopted in the present invention, the electric conductivity after the treatment is sufficiently high and a thick electrodeposited coating can be easily formed as is clear from the experimental results shown in Table 1. Furthermore, the treatment may sufficiently be carried out at such a low temperature as room temperature to a temperature somewhat higher than room temperature, so that heat and labor can be saved.

With increasing the concentration of organosilicon compound in the aqueous solution or dispersion used in this step, the electrodeposited coating tends to become thicker but, at the same time, the surface of the coating becomes rougher. In case the efficiencies of the coating, including its thickness, the state of coating surface and other factors, are collectively taken into consideration, therefore, the particularly preferable concentration of the organo-silicon compound is in the range of from 0.01 to 5%. Other preferable application conditions in this step are a liquid temperature in the range from 0° to 50° C., preferably from room temperature to 45° C., and an application time (i.e. dipping time or shower- or spray-supplying time) in the range from 30 seconds to 10 minutes. The concentration, the liquid temperature and the application time are optionally variable within the above-mentioned ranges, and the optimum conditions are decided in connection with the stability of the organo-silicon compound and with the subsequent step.

In this step, the group X of the organo-silicon compound condenses directly with aluminum hydrate if said group is a hydroxyl group, and if it is methoxy or ethoxy, it is hydrolyzed to a hydroxyl group, which then condenses with aluminum hydrate, whereby a surface coating of aluminum silicate is formed, and serves as a coupling agent for enhancing the adhesion to a paint which is to be electrodeposition-coated subsequently. It is believed that the reaction of the anodic oxide film with the organo-silicon compound in this step proceeds according to, for example, any of the following reaction formulas:

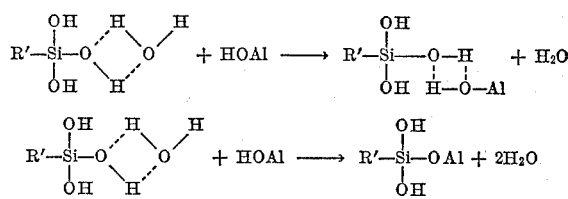

wherein R' is a group of the formula [R($CH_2$)$_n$].

Subsequently, electrophoresis coating and heat-curing of a resin paint are effected according to ordinary procedures. The aluminum silicate has an electric conductivity and hence is suspended as an anode, and the same or a different electroconductive metal is used as a cathode. These are electrically connected and an electric current is passed through the resulting circuit, upon which a coating of the paint is formed on the anode.

The electrodeposition coating composition contains a known thermosetting resin composition as the resin component. Generally, thermosetting resin has at least one reactive group selected from the group consisting of carboxyl, hydroxyl, methylol, alkoxymethylol, epoxy and the like. Thermosetting resins usable in the present invention are acrylic resins, alkyd resins, epoxy resins, ABS resins, melamine resins, phenol resins, mixtures of said resins, melamine-acrylic resins, melamine-alkyd resins, acryl-epoxy resins, alkyd-epoxy resins, phenol-alkyd resins and phenol-epoxy resins. The aforesaid reactive group in any of these resins undergoes a heat crosslinking reaction with the alkenyl, epoxy or amino group which is one of the reactive groups of the organo-silicon compound bonded to the anodic oxide film or, in some cases, with the unreacted hydroxyl group derived from the other reactive group X, i.e. the hydroxyl group which has not taken part in the reaction with aluminum hydrate, with the result that the resin is firmly bonded to the aluminum substrate. Particularly, the electrodeposition resins containing carboxyl, hydroxyl, methylol, alkoxymethylol or epoxy groups may be exemplified as follows:

Examples of the acrylic resins include resins which contain as essential component a vinylic monomer having a carboxyl group such as acrylic, methacrylic, itaconic, maleic, fumaric, aconitic, citraconic or crotonic acid and which contain as copolymerizing component a vinylic monomer containing a hydroxyl group such as 2-hydroxyethyl esters, hydroxypropyl esters, polypropylene glycol monoesters, polyethylene glycol monoesters of acrylic and methacrylic acids, monoacrylic and methacrylic esters of ethylene- and propylene-glycol phthalates; a vinylic monomer containing a methylol or alkoxymethylol group such as methylol acrylamides, methoxymethyl acrylamides, butoxymethyl acrylamides, methylol acrylamides, methoxymethyl methacrylamides and butoxymethyl methacrylamides; or a vinylic monomer containing an epoxy group such as glycidyl methacrylates.

Examples of the alkyd resins include alkyd resins obtained by the condensation reaction of a polybasic acid such as phthalic, maleic, sebacic or adipic acid, or an anhydride of said acid, with a polyhydric alcohol such as ethylene glycol, diethylene glycol, glycerin, trimethylolpropane, diglycerol, pentaerythritol or dipentaerythritol, and modified alkyd resins obtained by condensing the above-mentioned polybasic acids and polyhydric alcohols with each other in the presence of a drying oil such as tung oil, linseed oil, soybean oil or sunflower oil.

Examples of the phenol resins include phenol resins obtained by condensing phenols or phenol derivatives with formaldehydes.

Examples of the epoxy resins include fatty acid-monoesterified epoxy esters obtained by reacting diphenolic acid with epichlorohydrin and epoxy esters obtained by reacting bisphenol A with epichlorohydrin, esterifying with a polybasic acid one of the two epoxy groups of the resulting epoxy resin, and then monoesterifying the residual epoxy group with a polybasic acid.

Examples of the melamine resins include methylol derivatives obtained by condensing melamine with formaldehyde in the presence of acid or alkali, and etherification products of said methylol derivatives.

The electrodeposition is conducted according to a conventional electrophoresis coating process, in which an anodized plate treated in the aforesaid manner with an organo-silicon compound is dipped as an anode in an aqueous paint comprising an aqueous solution or emulsion of a salt obtained by neutralizing the above-mentioned resin with amine or ammonia, or in an aqueous paint prepared by adding an aqueous pigment dispersion or the like coloring material to said aqueous solution or emulsion; the anode is faced to a cathode plate to form an electric circuit; and a direct current is passed through said circuit.

Examples of suitable amines for the neutralization are alkylamines such as ethylamine, diethylamine, propylamine, isopropylamine, dipropylamine, diisopropylamine, n-butylamine, diethylpropylamine; substituted alkylamines, such as dimethylaminopropylamine; alkylenediamines, such as ethylenediamine, propylenediamine; alkanolamines such as monoethanolamine, n-butanolamine, aminomethylethanolamine, aminoethylethanolamine, monoisopropanolamine, morpholine, N - methylmorpholine, N-ethylmorpholine; and polyamines such as diethylenetriamine.

The aqueous pigment dispersion, which is one of the coloring materials, is prepared by dispersing a pigment in water by means of a nonionic or anionic surface active agent.

As the pigment, there may be used any known organic pigments, for example, phthalocyanine group pigments, azo group pigments, dioxazine group pigments, anthraquinone group pigments, perinone-perylene group pigments, indigo-thioindigo group pigments, carbon black, aniline black group pigments, quinacridone group pigments, etc., and any known inorganic pigments, for example, titanium oxide, chrome yellow, red iron oxide, cadmium yellow, cadmium red, cobalt blue, calcium carbonate, etc.

As the surface active agent, there may be used any known nonionic surface active agents, for instance, polyethylene glycol alkyl esters, polyethylene glycol alkyl ethers and polyethylene glycol alkylphenyl ethers, and any known anionic surface active agents, e.g. ammonium or amine salts of aliphatic carboxylic acids and of sulfuric acid esters.

Finally, the aluminum article after the electrodeposition is slightly washed with water and then dried at a temperature suitable for the electrodeposition bath composition. During this step, the electrodeposited composition undergoes a crosslinking curing reaction by itself to become a continuous coating layer. At the same time, the reactive group of the organo-silicon compound, e.g. epoxy or amino group, crosslinks with the reactive group of the electrodeposition resin composition, i.e. carboxyl, hydroxyl, methylol, alkoxymethylol or epoxy group, whereby a new silicon resin coating is formed at the interface between the said coating layer and the anodic oxide film.

Examples of the reaction between the organo-silicon compound and the electrodeposition resin composition are shown below.

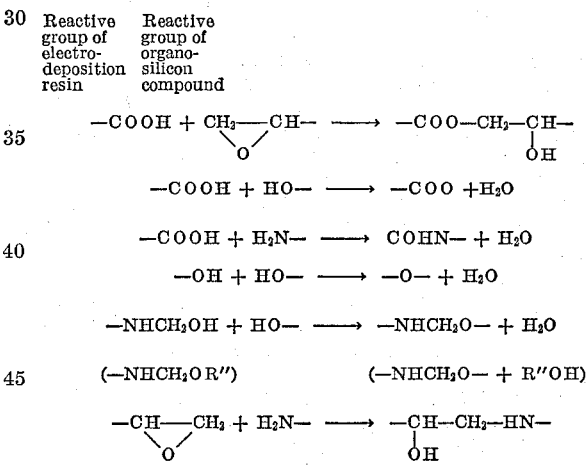

As evidence to substantiate the fact that a novel composite coating layer is formed according to the present process, there may be exemplified the following analysis example:

A high purity (99.99%) aluminum plate was slightly etched by dipping in a 10% sodium hydroxide bath at 60° C. for 2 minutes, washed with water, neutralized by dipping in a 15% nitric acid bath at room temperature for 30 seconds, and then washed with water. Thereafter, the thus treated aluminum plate was subjected to anodic oxidation treatment in a 15% $H_2SO_4$ bath at a bath temperature of 20° C. while passing an electric current for 30 minutes at a current density of 1 a./dm.$^2$ to form thereon an oxide film of $9\mu$ in thickness. This anodized plate was washed with water, dipped at room temperature for 3 minutes in a 3% aqueous solution of N-$\beta$-(aminoethyl) - $\gamma$ - aminopropyl-trimethoxysilane, again washed with water and then subjected to electrodeposition in a bath containing a water-soluble acrylic-melamine resin while passing an electric current at 100 v. for 2 minutes. After the electrodeposition, the plate was washed with water and then dried in a gas furnace at 180° C. for 30 minutes. A test piece of 10 mm. x 20 mm. was cut from the electrodeposition coated plate and embedded in a normal temperature-setting epoxy resin, and the cross-section thereof was carefully buffed. Subsequently, the test piece was subjected to analysis by use of an X-ray microanalyzer to observe that Si had been distributed on the anodic oxide film.

The present invention is illustrated in more detail below with reference to examples, but the examples are illustrative and are not limitative.

EXAMPLE 1

A commercially available pure aluminum plate (JIS H-4000 and 1200) of 50 mm. x 100 mm. x 0.8 mm. in size was subjected to such pre-treatment that it was slightly etched by dipping in a 10% sodium hydroxide bath at 60° C. for 2 minutes, washed with water, neutralized by dipping in a 15% nitric acid bath at room temperature for 30 seconds, and then washed with water. (In each of the examples after Example 2, the pre-treatment was carried out in the same manner as above, and therefore the explanation of said treatment is omitted.) After the pre-treatment, the aluminum plate was subjected to anodic oxidation treatment in a 15% $H_2SO_4$ bath under the conditions of a bath temperature of 20° C., a current density of 1 a./dm.$^2$ and a current flowing time of 30 minutes to form on the plate an anodic oxide film of 8.5$\mu$ in thickness. The thus prepared sample was washed with water and then dipped at room temperature for 3 minutes in a 0.1% aqueous solution of $\gamma$-methacryloxypropyltrimethoxysilane.

On the other hand, a copolymer comprising 59 parts of butyl acrylate, 21 parts of methyl methacrylate, 12 parts of N-methylol acrylamide and 8 parts of acrylic acid was neutralized with triethylamine to obtain a water-soluble vinyl copolymer. 100 parts of the thus obtained copolymer was mixed with 20 parts of hexamethoxy-methylolmelamine, and the resulting mixture was diluted to a concentration of 15% by use of deionized water and adjusted to pH 8.1 to prepare an electrodeposition liquid.

Using this electrodeposition liquid, the aluminum plate which had been treated with the aforesaid organo-silicon compound was subjected as an anode to electrodeposition while passing an electric current for 2 minutes under the conditions of a liquid temperature of 25° C., anode-cathode distance of 10 cm. and a voltage of 110 v. Subsequently, the aluminum plate was washed with water and then heated in a gas furnace at 180° C. for 30 minutes to dry and cure the coating.

As the result, a uniform continuous coating was formed on the surface of the sample, and the cross-section thereof was microscopically observed to find that an organic layer of 15$\mu$ in thickness had been formed on the oxide film.

COMPARATIVE EXAMPLE 1

A commercially available pure aluminum plate (JIS H-4000 and 1200) of 50 mm. x 100 mm. x 0.8 mm. in size was subjected to the same pre-treatment and anodic oxidation treatment as in Example 1 to form thereon an anodic oxide film of 8.5$\mu$ in thickness. This aluminum plate was immediately subjected, without treatment with organo-silicon compound, to the same electrodeposition as in Example 1, and then dried in a gas furnace at 180° C. for 30 minutes. The resulting coating was microscopically observed to find that the thickness thereof was 13$\mu$.

The coatings formed according to Example 1 and Comparative Example 1 were compared in properties with each other to obtain the results as shown in Table 2. As seen in Table 2, the aluminum plate, which had been treated with the organo-silicon compound and then subjected as an anode to electrodeposition coating, was enhanced in acid resistance, alkali resistance and adhesion of the resulting coating.

TABLE 2

| Test item | Example 1 | Comparative Example 1 |
|---|---|---|
| Pencil hardness (JIS K-5400) | 2H | 2H. |
| Erichsen test (JIS B-7729 and 7777) | Not peeled | Not peeled. |
| Cross cut [1] | 100/100 | 100/100. |
| Falling test: (JISK-5400), (Du Pont impact test), 500 g.,½′, 50 cm. | Neither cracked nor peeled. | Not peeled. |
| Tape peeling test [2] | Not peeled | Partially peeled. |
| Alkali resistance [3] (5% NaOH, 48 hrs.) | No. 8F | No. 8M. |
| Acid resistance [3]: | | |
| (5% HCl, 168 hrs.) | No change | No. 8M. |
| (5% $H_2SO_4$, 168 hrs.) | do | No. 8M. |

[1] Using a sharp knife, make 11 parallel cuts through the film at 1 mm. spacing. Make 11 similar cuts at 90° to and crossing the first 11 cuts to form 110 squares of 1 mm. x 1 mm. in area. Apply No. 600 Scotch Cellophane tape firmly to the area, pull off the tape sharply and count the number of the residual squares.
[2] The tape peeling test was carried out by subjecting the sample to the falling test, applying the above-mentioned Scotch Tape No. 600 onto projected portions of the coating of the sample after the falling test and then quickly peeling the tape from the sample.
[3] The alkali and acid resistance values are individually the state of the coating after alkali or acid resistance test, and were represented, respectively, by the blister size No. 8 in Fig. 4 of ASTM D 714-56. The marks F and M are abbreviations of "Few" and "Medium" which are shown in said Fig. 4.
Other tests were carried out according to the methods regulated in JIS K-5400.

Other tests were carried out according to the methods regulated in JIS K-5400.

EXAMPLE 2

A commercially available pure aluminum plate (JIS H-4000 and 1200) of 50 mm. x 100 mm. x 0.8 mm. in size was subjected to pre-treatment and then to anodic oxidation treatment using an electrolyte containing 15% of $H_2SO_4$ and 2% of $(COOH)_2$ under the conditions of an electrolyte temperature of 20° C., a current density of 2 a./dm. and a current flowing time of 20 minutes to form on the plate an anodic oxide film of 6$\mu$ in thickness. The thus prepared sample plate was washed with water and then dipped at room temperature for 1 minute in a 0.1% aqueous solution of $\beta$-(3,4-epoxycyclohexyl) ethyl trimethoxysilane.

On the other hand, a copolymer comprising 52 parts of ethyl acrylate, 13 parts of methyl methacrylate, 9 parts of 2-hydroxypropyl acrylate, 6 parts of acrylic acid and 20 parts of N-butoxymethylol acrylamide was neutralized with dimethylethanolamine and then diluted to a concentration of 15% by use of deionized water to prepare an electrodeposition liquid (pH 8.15).

Using this electrodeposition liquid, the aluminum plate which had been treated with the aforesaid organo-silicon compound was subjected as an anode to electrodeposition while passing an electric current for 3 minutes under the conditions of a liquid temperature of 25° C., an anode-cathode distance of 10 cm. and a voltage of 110 v. Subsequently, the aluminum plate was washed with water and then heated in a gas furnace at 170° C. for 30 minutes to dry and cure it.

When measured by use of a microscope, the thickness of the resulting coating was 16$\mu$. The thus formed coating was excellent in adhesion and corrosion resistance.

EXAMPLE 3

A commercially available pure aluminum plate (JIS H-4000 and 1200) of 50 mm. x 100 mm. x 0.8 mm. in size was subjected to pre-treatment and then to anodic oxidation treatment using an electrolyte containing 30% of $H_2SO_4$ and 1.0% of $MgCl_2$ under the conditions of an electrolyte temperature of 30° C., a current density of 25 a./dm.$^2$ and a current flowing time of 90 seconds to form on the plate an anodic oxide film of 5$\mu$ in thickness. The thus prepared sample plate was sufficiently washed with water and then dipped at 20° C. for 90 seconds in a solution formed by diluting N-$\beta$-(aminoethyl)-$\gamma$-aminopropylmethyl dimethoxysilane to a concentration of 0.1% by use of an aqueous acetic acid solution at pH 4.

On the other hand, 50 parts of Epikote #1001 (an epoxy resin produced by Shell Chemical Co.) was condensed with 14 parts of linoleic acid, and the resulting epoxy ester was further reacted with 11 parts of phthalic anhydride to obtain a resin having an acid value of 57. This resin was neutralized with triethanolamine, diluted to a concentration of 10% by use of deionized water and then adjusted to pH 8.2 to prepare an electrodeposition liquid.

Using this electrodeposition liquid, the aluminum plate which had been treated with the aforesaid organo-silicon compound was subjected as an anode to electrodeposition while passing an electric current for 2 minutes under the conditions of a liquid temperature of 25° C., an anode-cathode distance of 10 cm., and a voltage of 90 v. Subsequently, the aluminum plate was washed with water and then heated in a gas furnace at 170° C. for 20 minutes to dry and cure it. As the result, a uniform continuous coating was formed on the surface of the sample, and the cross-section of the coating was examined by use of a microscope to find that the thickness thereof was $10\mu$. The thus formed coating was excellent in adhesion and corrosion resistance.

EXAMPLE 4

A commercially available pure aluminum plate (JIS H-4000 and 1200) of 50 mm. x 100 mm. x 0.8 mm. in size was subjected to pre-treatment and then to anodic oxidation treatment using an electrolyte containing 15% of $H_2SO_4$ under the conditions of an electrolyte temperature of 20° C., a current density of 1 a./dm.$^2$ and a current flowing time of 10 minutes to form on the plate an anodic oxide film of $2.8\mu$ in thickness. The thus treated aluminum plate was dipped at 30° C. for 1 minute in a solution formed by diluting $\gamma$-glycidoxypropyl trimethoxysilane to a concentration of 0.1% by use of a 30% aqueous solution of isopropanol.

On the other hand, a mixture comprising 27.5 parts of dehydrated castor oil, 10 parts of soybean oil, 5 parts of rosin and 0.7 part of pentaerythritol was esterified at 260° to 270° C. until the acid value of the mixture became 0. Subsequently, the esterified mixture was charged with 10 parts of maleic anhydride and 13.6 parts of trimethylpropane, and then esterified at 150° C. to an acid value of 70 to obtain an alkyd resin. 100 parts of the thus obtained alkyd resin was mixed at below 60° C. with 30 parts of hexamethoxymethylol melamine, and the resulting mixture was neutralized with dimethylethanolamine, diluted to a concentration of 10% by use of deionized water and then adjusted to pH 8.0 to prepare an electrodeposition liquid.

Using this electrodeposition liquid, the aluminum plate which had been treated with the aforesaid organo-silicon compound was subjected as an anode to electrodeposition while passing an electric current for 3 minutes under the conditions of a liquid temperature of 25° C., an anode-cathode distance of 10 cm. and a voltage of 130 v. Subsequently, the aluminum plate washed with water and then heated in a gas furnace at 170° C. for 30 minutes to dry and cure it. As the result, a uniform continuous coating was formed on the surface of the sample, and the cross section of the coating was examined by use of a microscope to find that the thickness thereof was $7\mu$. The thus formed coating was excellent in adhesion and corrosion resistance.

EXAMPLE 5

A commercially available pure aluminum plate (JIS H-4000 and 1200) of 50 mm. x 100 mm. x 0.8 mm. in size was subjected to the same pre-treatment and anodic oxidation treatment as in Example 1 to form on the plate an anodic oxide film of $8.5\mu$ in thickness. The thus prepared sample plate was washed with water and then dipped at room temperature for 3 minutes in a 0.1% aqueous solution of vinyl triethoxysilane.

Subsequently, the aluminum plate which had been treated with the aforesaid organo-silicon compound was subjected to electrodeposition coating. The electrodeposition liquid was prepared in the following manner:

A mixture comprising 50.9 parts of copper Phthalocyanine Blue paste (solid content 39.3%), 8 parts of polyoxyethylene nonylphenyl ether (HlB 14.2) and 41.1 parts of water was stirred and then passed to a speed line mill to prepare a blue aqueous pigment dispersion (solid content 39.8%, pH 7.7, electric conductivity $0.129\times10^4$ $\mu\Omega$/cm.). On the other hand, a copolymer comprising 59 parts of butyl acrylate, 21 parts of methyl methacrylate, 12 parts of N-methylol acrylamide and 8 parts of acrylic acid was neutralized with triethylamine, and the resulting water-soluble vinyl copolymer was diluted to a concentration of 15% by use of deionized water to form a 15% aqueous solution of the copolymer (pH 8.10). 100 parts of the thus formed aqueous solution was mixed with 0.4 part of the above-mentioned aqueous pigment dispersion to prepare the electrodeposition liquid.

Electrodeposition conditions were a liquid temperature of 25° C., an anode-cathode distance of 10 cm., a voltage of 110 v., and a current flowing time of 2 minutes. After the electrodeposition, the sample was washed with water and then heated in a gas furnace at 180° C. for 30 minutes to dry and cure it, whereby a blue uniform coating was formed on the surface of the sample.

The cross section of the thus treated sample was examined by use of a microscope to find that an organic layer of $15\mu$ in thickness had been formed on the anodic oxide film. The thus formed layer was markedly excellent both in adhesion and in corrosion resistance.

EXAMPLE 6

A commercially available pure aluminum plate (JIS H-4000 and 1200) of 50 mm. x 100 mm. x 0.8 mm. in size was subjected to the same pre-treatment and anodic oxidation treatment as in Example 1 to form on the plate an anodic oxide film of $8.5\mu$ in thickness. The thus treated plate was washed with water and then dipped at room temperature for 1 minute in a 0.01% aqueous solution of N-$\beta$-(aminoethyl)-$\gamma$ - aminopropylmethyl-dimethoxysilane. Subsequently, the aluminum plate was subjected as an anode to electrodeposition under the same conditions as in Example 1 and then heated in a gas furnace at 180° C. for 30 minutes to dry and cure it, whereby a uniform continuous coating was formed on the anodic oxide film of the aluminum plate. The cross section of the coating was examined by use of a microscope to find that the thickness thereof was $15\mu$. The thus formed coating was excellent both in adhesion and in corrosion resistance.

EXAMPLE 7

A commercially available pure aluminum plate (JIS H-4000 and 1200) of 50 mm. x 100 mm. x 1.0 mm. in size was subjected to the same pre-treatment as in Example 1 and then to an anodic oxidation treatment in a 15% $H_2SO_4$ bath at a bath temperature of 21° C., at a current density of 2 a./dm.$^2$ for 4 min. to obtain an anodic oxide film of $2\mu$ in thickness. The thus treated plate was washed with water and then dipped in a 0.1% aqueous solution of N-$\beta$-(aminoethyl)-$\gamma$-aminopropyltrimethoxysilane solution at room temperature for 1 min.

Using an electrodeposition liquid prepared by substituting 2-hydroxyethyl methacrylate for the N-methylol acrylamide and dimethylethanolamine for the triethylamine in the preparation of the water-soluble vinylic copolymer in Example 1, the aluminum plate treated with the organo-silicon compound was subjected as an anode to electrodeposition while passing an electric current for 1.5 minutes under the conditions of a liquid temperature of 26° C., an anode-cathode distance of 10 cm., and a voltage of 120 v. Subsequently, the aluminum plate was washed with water and then heated in a gas furnace at 200° C. for 30 minutes to dry and cure it.

As a result, a uniform continuous coating film was formed on the surface of the sample, and the cross-section thereof was microscopically observed to find that an organic layer of 18μ in thickness had been formed on the oxide film.

COMPARATIVE EXAMPLE 2

The same aluminum plate as in Example 7 was subjected to the same pre-treatment and the same anodic oxidation treatment as in Example 7 to obtain an anodic oxide film of 2μ in thickness. The thus treated aluminum plate was subjected as an anode, without treatment with the organo-silicon compound, to electrodeposition in the same electrodeposition bath as in Example 7 while passing an electric current for 2 minutes at 26° C. at an anode-cathode distance of 10 cm. at a voltage of 120 v., and then heated in a gas furnace at 200° C. for 30 minutes to dry and cure it.

The measurement of the thickness of the coating film by a microscope showed that it was 18μ.

The coating film obtained in Example 7 and the coating film obtained in Comparative Example 2 were subjected to a film property test after dipping in hot water to obtain the results shown in Table 3, from which it is seen that the coating film obtained by electrodeposition after the treatment with organo-silicon compound showed substantially no degradation, while the coating film obtained by electrodeposition without the treatment with organo-silicon compound showed degradation in hardness, alkali resistance and mortar resistance.

was 16μ. The resulting film was excellent in adhesion and corrosion resistance.

What is claimed is:

1. In a process for electrodeposition-coating an aluminum article which comprises subjecting the aluminum article to anodic oxidation treatment, dipping the anodized aluminum article in an aqueous emulsion or solution of a thermosetting resin composition, applying a direct current to the aluminum article to electrodeposit thereon the resin contained in said aqueous emulsion or solution, and then heat-curing the resin coating electrodeposited on the aluminum article, an improvement which comprises applying to the surface of the anodized aluminum article prior to the electrodeposition, an aqueous solution, aqueous dispersion or organic solvent solution of an organo-silicon compound represented by the general formula,

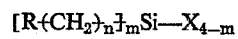

wherein $m$ is an integer of 1 to 3; $n$ is 0 or an integer of 1 to 3; R, in the case where $n$ is 0, is a lower alkenyl group, and R, in the case where $n$ is an integer of 1 to 3, is an amino group, an alkylenediamino group, a lower alkanolamino group, an $\alpha,\beta$-unsaturated lower aliphatic carboxylic acid residue, an alkoxy group having an epoxy group, or a cycloalkyl group having an epoxy group; and X is at least one member selected from the group consisting of a lower alkoxy group, a lower alkoxyalkoxy group, a saturated lower aliphatic carboxylic acid residue,

TABLE 3

| Test item | Test condition | | Dipping in hot water [1] | Example 7 (with silane treatment) | | | | Comparative Example 2 (without silane treatment) | | | |
|---|---|---|---|---|---|---|---|---|---|---|---|
| | 2H–5H | | | 2H | 3H | 4H | 5H | 2H | 3H | 4H | 5H |
| Pencil hardness | ○=Good (no flaw); △=Flaws on film; ▲=One flaw reached substrate: X=Flaws reached substrate. | | A | ○ | △ | ▲ | X | △ | △ | X | X |
| | | | B | △ | △ | ▲-X | X | △ | △ | X | X |
| | | | C | ○ | △ | ▲ | X | ○ | △ | X | X |
| | | | D | ○ | △ | ▲ | X | ○ | △ | ▲-X | X |
| Alkali resistance | {2% NaOH, testing time, 4 hrs | | A | Good | | | | Partly peeled. | | | |
| | | | B | Completely peeled | | | | Completely peeled. | | | |
| | {2% NaOH, testing time, 24 hrs | | D | Good | | | | Completely peeled. | | | |
| | | | C | Good | | | | Completely peeled. | | | |
| Mortar resistance | Dipped in mortar for one week [2] | | A | Good | | | | Blister 5% (area). | | | |
| | | | B | Blister on whole | | | | Blister on whole. | | | |
| | | | C | Fine blister up to 1% | | | | Blister 5% (area). | | | |
| | | | D | Fine blister up to 1% | | | | Blister 5% (area). | | | |

[1] A=boiling for one hr.; B=boiling for 5 hrs.; C=at 60° C. for 50 hrs.; D=at 60° C. for 100 hrs.
[2] Test specimen was dipped in a mixture of cement, sand and water in a weight ratio of 1:3:1.

EXAMPLE 8

A commercially available pure aluminum plate (JIS H–4000 and 1200) of 50 mm. x 100 mm. x 0.8 mm. was subjected to the same pre-treatment and anodic oxidation treatment as in Example 1 to obtain an anodic oxide film of 8.5μ in thickness. The thus treated plate was washed with water and then dipped in a 0.1% solution of N-β-(aminoethyl)-γ-aminopropylmethyldimethoxysilane in an aqueous acetic acid solution having a pH of 4 at 20° C. for 90 seconds.

To 100 parts of a water-soluble vinylic copolymer obtained by neutralizing with triethylamine a copolymer consisting of 55 parts of isobutyl acrylate, 20 parts of methyl methacrylate, 15 parts of polypropylene glycol monomethacrylate and 10 parts of acrylic acid was added 30 parts of pentamethoxymonobutoxymethylol melamine, and the resulting mixture was diluted with deionized water to 15%. The pH was adjusted to 8.00.

Using the thus obtained electrodeposition liquid, the aluminum plate treated with the organo-silicon compound was subjected as an anode to electrodeposition while passing an electric current for 1.5 minutes under the conditions of a liquid temperature of 25° C., an anode-cathode distance of 10 cm. and a voltage of 110 v. Subsequently, the aluminum plate was washed with water and then heated in a gas furnace at 170° C. for 30 minutes to dry and cure it.

The cross-section of the plate was microscopically observed to find that the thickness of the resulting film a hydroxyl group and a lower alkyl group, provided that the case where all the groups represented by X are lower alkyl groups at the same time is excluded.

2. A process according to claim 1, wherein the concentration of the organo-silicon compound in the aqueous solution, aqueous dispersion or organic solvent solution of an organo-silicon compound is in the range from 0.01 to 5% by weight.

3. A process according to claim 1, wherein the anodized aluminum article is dipped in the aqueous solution, aqueous dispersion or organic solvent solution of an organo-silicon compound.

4. A process according to claim 1, wherein the aqueous solution, aqueous dispersion or organic solvent solution of an organo-silicon compound is applied to the surface of the anodized aluminum article by spraying or showering.

5. A process according to claim 1, wherein the concentration of the organo-silicon compound in the aqueous solution, aqueous dispersion or organic solvent solution of an organo-silicon compound is in the range of from 0.01 to 5% by weight, the temperature of said aqueous solution, aqueous dispersion or organic solvent solution is in the range of from 0° to 50° C., and the time of applying to the aluminum article said aqueous solution, aqueous dispersion or organic solvent solution is in the range of from 30 seconds to 10 minutes.

6. A process according to claim 1, wherein the aqueous solution of an organo-silicon compound is a solution of the organo-silicon compound in water or in a mixed solvent comprising water and an alcohol, ketone or amine.

7. A process according to claim 1, wherein the aqueous dispersion of an organo-silicon compound is a dispersion of the organo-silicon compound in water containing or not containing an emulsifier.

8. A process according to claim 1, wherein the organic solvent solution of an organo-silicon compound is a solution of the organo-silicon compound in an alcohol, a ketone, an ether or an ester.

9. A process according to claim 1, wherein R in the general formula representing the organo-silicon compound is an amino or alkylenediamino group.

10. A process according to claim 1, wherein the organo-silicon compound is N - β-(aminoethyl)-γ-aminopropyl-trimethoxysilane.

11. A process according to claim 1, wherein the organo-silicon compound is N - β - (aminoethyl)-γ-aminopropyl-methyl dimethoxysilane.

12. A process according to claim 1, wherein the aqueous emulsion or solution of a thermosetting resin composition contains a pigment dispersion in an aqueous medium with a nonionic or anionic surface active agent.

13. A process according to claim 12, wherein the pigment is at least one member selected from the group consisting of phthalocyanine group pigments, azo group pigments, anthraquinone group pigments, perinone-perylene group pigments, indigo-thioindigo group pigments, dioxazine group pigments, quinacridone group pigments, aniline black group pigments, carbon black, chrome yellow, red iron oxide, cobalt blue, titanium oxide, cadmium yellow, cadmium red and calcium carbonate.

14. A process according to claim 12, wherein the surface active agent is at least one member selected from the group consisting of alkyl esters, alkyl ethers and alkylphenyl ethers of polyethylene glycol, and ammonium and amine salts of fatty acids and of fatty alcohol sulfuric acid esters.

15. A process for electrodeposition-coating an aluminum article which comprises subjecting the aluminum article to anodic oxidation treatment in a 10 to 30% $H_2SO_4$ solution with application of a direct current to form an anodic oxide film on the aluminum article, applying to the anodized aluminum article a 0.01 to 5% aqueous solution of N - β - (aminoethyl)-γ-aminopropyl trimethoxysilane or N - β - (aminoethyl)-γ-aminopropyl dimethoxysilane, electrodepositing on the thus treated aluminum article a thermosetting resin composition containing as a fundamental constituent an ammonium or amine salt of a copolymer comprising an α,β-ethylenically unsaturated monomer and an α,β-ethylenically unsaturated carboxylic acid, at 60 to 150 v. in an aqueous bath containing said resin at a concentration of 10 to 15%, and then heating the electrodeposition-coated aluminum article at 200° to 220° C.

References Cited
UNITED STATES PATENTS

| | | | |
|---|---|---|---|
| 3,497,440 | 2/1970 | Weigel | 204—181 |
| 3,622,473 | 11/1971 | Ohta et al. | 204—181 |

HOWARD S. WILLIAMS, Primary Examiner